Patented May 27, 1952

2,598,103

UNITED STATES PATENT OFFICE 2,598,103

RIBOFLAVIN-GLYOXAL CONDENSATION PRODUCTS

Jean Q. Bellard, Indianapolis, and George H. F. Schnakenberg, Plainfield, Ind., assignors to Eli Lilly and Company, Indianapolis, Ind., a corporation of Indiana No Drawing. Application July 30, 1949,
Serial No. 107,824

5 Claims. (Cl. 260—211.3)

This invention relates to a solubilization of riboflavin, and more particularly to a condensation product of riboflavin with glyoxal.

Riboflavin, also known as 9-d-ribityl-6,7-dimethyl isoalloxazine, or vitamin $B_2$ has a limited solubility in water which prevents the preparation of aqueous riboflavin solutions of a concentration suitable for therapeutic use. The solubility of riboflavin in water is about 12 mg. per 100 cc. at 81.5° F., or 0.012 percent. Since therapeutic doses of riboflavin which are presently employed range from 5 to 30 mg., the administration of about 40 to 250° cc. of solution would be required to supply the necessary dose for a human being. The administration of such large amounts of solution is obviously generally undesirable.

It has been proposed to increase the water solubility of riboflavin by incorporating in its aqueous solutions various substances such as nicotinamide, water-soluble salts of benzoic, salicylic, or gallic acids, urea, alkylated amides of lower fatty acids, amides of gentisic acid with lower aliphatic hydroxyamines, and the like. Such additives have been required in relatively large quantities if amounts of riboflavin significantly greater than normal are to be made soluble. Thus, the toxicity or possible physiological action of such additives, when present in large amounts, is a factor which must be considered in addition to the toxicity of the riboflavin itself. Furthermore, many of those substances previously employed are naturally of an alkaline nature, and provide riboflavin solutions which are close to neutral or actually alkaline in reaction. Riboflavin itself is less stable in alkaline solution; and in addition, it is difficult to make use of such solutions to prepare multiple vitamin products, since other of the water-soluble vitamins such as thiamin, ascorbic acid and the like are stable only in the presence of an acid pH. It is therefore highly desirable that riboflavin preparations be acidic in nature.

It is an object of this invention to prepare compositions of riboflavin having relatively high water solubility. It is another object of this invention to prepare compositions of riboflavin which will not precipitate on standing in concentrated solution. A still further object of this invention is to prepare riboflavin compositions which are stable in acid media. Other objects of this invention will appear from the disclosures made hereinafter.

In accordance with the above and other objects of this invention, the surprising discovery has been made that riboflavin may be condensed with glyoxal to yield a complex of riboflavin and glyoxal which is highly soluble in water, which will not precipitate from its concentrated solutions on storage, and which is stable in acid solution. It is known that glyoxal possesses the property of rendering insoluble compounds which contain a plurality of hydroxyl groups. It is therefore highly unexpected to find that glyoxal serves the purpose of solubilizing riboflavin, part of the molecule of which consists of a ribityl radical containing 4 hydroxyl groups.

Glyoxal, the simplest dialdehyde, is an easily polymerized liquid which exists in aqueous solution as a mixture of a series of nonvolatile, hydrated forms as monomers and simple polymers according to the following formulae:

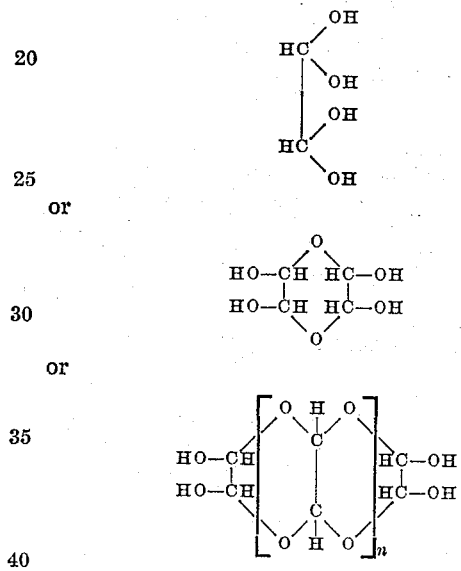

where $n$ is a whole number up to 4, depending upon the concentration of the solution. These forms of hydrated glyoxal appear to be in equilibrium with one another and they undergo the reactions of the unhydrated aldehyde. It has been found that it is not cricital which particular form of glyoxal is employed in the process of this invention. Glyoxal, or any of the forms of glyoxal which are present in an aqueous solution of glyoxal, are suitable for the purposes of preparing the novel riboflavin composition herein described.

Broadly speaking, the novel condensation product of the present invention is prepared by heating an aqueous mixture of riboflavin and glyoxal until substantially all of the riboflavin has been dissolved. Preferably, the solution thus formed is merely filtered and used directly, since concentrations of riboflavin up to 70 mg. per cc. may be obtained in this way. The solution can, however, be concentrated to any desired amount by evaporation; and can be used as such or incorporated into various therapeutic compositions. Alternatively, the reaction mixture can be evaporated to dryness, whereupon a solid, stable product is obtained, which can be used in dry vitamin preparations, and which is readily redissolved in water to allow the preparation of solutions containing riboflavin in high concentrations. The amount of glyoxal which has been found to be optimal is about three times the weight of the riboflavin used. However, more or less glyoxal may be used as desired and as little as about twice or as much as about five times the weight of riboflavin to be solubilized can be successfully employed. The use of greater proportions of glyoxal will yield material containing a lower percentage of riboflavin.

Preferably, the glyoxal is used as an aqueous solution of about 30 percent concentration, in which form it is commercially available. The period of heating should not be prolonged beyond the time necessary for complete solution of the riboflavin, or a low recovery of riboflavin may result. If desired, the reaction mixture may be heated for a time insufficient to completely dissolve the riboflavin. The undissolved riboflavin is then filtered off, and recovered, and the solution is used for therapeutic preparations or is evaporated as described. However, it is preferred to heat the reaction mixture at refluxing temperature and to continue heating until all of the riboflavin has been solubilized.

The pH of the reaction mixture at the completion of period of heating is generally about pH 1.5. To use the riboflavin-glyoxal complex in various therapeutic compositions where a higher pH is required, the pH of the complex or of the therapeutic composition may readily be adjusted in the usual manner by the addition of a basic material. Suitable materials for adjusting the pH are the strong alkalies, alkali-metal carbonates and bicarbonates, ammonium and substituted ammonium compounds, and strongly basic amines.

The riboflavin-glyoxal complex or condensation product which is formed by the process of this invention is stable in acid solutions ranging from pH 1.5 to pH 7, and may be stored for long periods of time without substantial loss of vitamin potency. The new complex may readily be incorporated into multiple vitamin preparations which are suitable in every way for therapeutic use. Although the exact structure and chemical composition of the riboflavin-glyoxal complex of this invention are not known, it is believed that the riboflavin-glyoxal reaction product exists in the same form in the dehydrated product as in the concentrated solution formed in the reaction, since the solid product may be redissolved in water to give a solution having all the characteristics of the liquid, unevaporated reaction mixture.

It has been further discovered that the novel riboflavin-glyoxal complex of this invention has the unexpected property of stabilizing vitamin A in aqueous dispersion as when prepared with the aid of dispersing agents. Vitamin A is normally unstable when prepared as an aqueous dispersion, and rapidly loses its potency even under refrigeration. The addition of the novel product of this invention to such vitamin A dispersions, as in aqueous multiple vitamin preparations, brings about a stabilization of the vitamin A.

The preparation and use of the novel riboflavin-glyoxal complex of this invention are further illustrated by the following examples.

*Example 1*

Preparation of solid riboflavin-glyoxal complex.

150 g. of riboflavin and 1500 cc. of an aqueous solution containing about 30 percent of glyoxal are placed in a flask fitted with a reflux condenser and refluxed for 3 hours. The resulting clear, dark brown solution is filtered through a sintered glass filter of medium porosity, and the residue, comprising a small amount of unreacted riboflavin, is collected for recovery. The filtrate is evaporated to dryness in vacuo, whereupon a porous brown colored mass weighing about 900 g. is formed. This is removed from the vessel in which the evaporation was conducted, and powdered, and is suitable for use in therapeutic compositions without further purification.

Riboflavin-glyoxal complex prepared according to the procedure outlined above contained 7.7 percent riboflavin, and could be dissolved in water to form a clear, brownish solution which contained 42 mg. of riboflavin per cc.

*Example 2*

Preparation of liquid riboflavin-glyoxal complex.

A mixture of 5 g. of riboflavin and 50 cc. of about 30 percent aqueous glyoxal is placed in a flask fitted with a reflux condenser and refluxed until the mixture becomes clear, or for approximately 3 hours on an oil bath at a maximum temperature of 162° C. The resulting solution has a volume of about 53 cc. The reaction mixture is filtered, and then comprises a clear, dark brown solution of riboflavin-glyoxal complex, which is used to prepare aqueous solutions of riboflavin for therapeutic purposes.

A concentrated liquid riboflavin-glyoxal complex thus prepared assayed about 67.9 mg. of riboflavin per cc., and had a pH of about 1.5.

*Example 3*

Adjustment of the pH of liquid riboflavin-glyoxal complex.

A liquid riboflavin-glyoxal complex prepared according to the procedure set forth in Example 2, and having a pH of about 1.5, is treated with solid sodium carbonate. The mixture is stirred until solution of the sodium carbonate is complete, continuing the addition of sodium carbonate until the desired pH is reached. In this way a liquid riboflavin-glyoxal complex, in the range of pH 2 to pH 6.5 or higher, as desired, is prepared. The solution is filtered to remove any insoluble resinous material which may be formed if high local concentrations of base are allowed to accumulate, as by insufficient stirring, and is then suitable for incorporation into any therapeutic prparation requiring riboflavin.

*Example 4*

Adjustment of the pH of liquid riboflavin-glyoxal complex.

Alternative suitable solid basic materials which may be used in the procedure set out in Example 3 to prepare a concentrated liquid riboflavin-glyoxal complex in the higher acid pH ranges are the following: sodium bicarbonate, sodium hydroxide, nicotinamide, potassium carbonate, sodium citrate, ethylene diamine, potassium bicarbonate and potassium hydroxide.

*Example 5*

Riboflavin-containing solution suitable for parenteral use.

The following ingredients are stirred until solution has taken place:

| | |
|---|---|
| Riboflavin-glyoxal complex from Example 1, and assaying 7.7 percent of riboflavin _____ g__ | 65.0 |
| Pyrogen-free distilled water, to make__cc__ | 1000 |

The resulting solution, containing 5 mg. of riboflavin per cc., is adjusted to pH 4.5 with solid sodium carbonate, filtered, filled into ampoules and sealed. The ampoules can be heat-sterilized, and may be kept for months without formation of a precipitate or loss of potency.

*Example 6*

Preparation of a multiple vitamin-containing product.

A solution is prepared by mixing the following materials:

| | |
|---|---|
| Water (to make) _____ cc__ | 500 |
| Solid riboflavin-glyoxal complex assaying about 7.98 percent riboflavin_____ g__ | 10.338 |
| Tween 80 _____ g__ | 25 |
| Vitamin A concentrate (800,000 units/g.) _____ g__ | 6.875 |
| Ascorbic acid _____ g__ | 110 |
| Sodium pantothenate_____ g__ | 2.864 |
| Thiamin _____ g__ | 1.83 |
| Nicotinamide _____ g__ | 14.65 |
| Pyridoxine hydrochloride_____ g__ | 0.918 |
| Concentrated distilled natural tocopherols _____ g__ | 2.5 |

The resulting product contains in each cc., 1.65 mg. of riboflavin, 11,000 units of vitamin A, 1.835 mg. of pyridoxine hydrochloride, 220 mg. of ascorbic acid, 5 mg. of tocopherols, 2.66 mg. of thiamin, 5.0 mg. of pantothenic acid as sodium pantothenate, and 29.3 mg. of nicotinamide, and is suitable for oral vitamin medication. It is stable in all respects over a long period of time.

*Example 7*

Liquid riboflavin preparation, using a concentrated liquid riboflavin-glyoxal complex.

83.3 cc. of a liquid riboflavin-glyoxal complex, assaying 30 mg. of riboflavin per cc., prepared according to the procedure set out in Example 2 and adjusted to pH 4.5 according to the procedure set out in Example 3, are diluted to 500 cc. with pyrogen-free distilled water. The resulting clear, light brown solution, containing 5 mg. of riboflavin per cc., is filtered, and filled into 5 cc. ampoules. The ampoules are heat-sterilized and the solution is then ready for parenteral use.

*Example 8*

Preparation of a vitamin B complex solution.

A solution is prepared by mixing the following materials:

| | |
|---|---|
| Riboflavin-glyoxal complex containing 7.7 percent of ribaflavin_____ g__ | 16.234 |
| Nicotinamide _____ g__ | 6.25 |
| Thiamin hydrochloride_____ g__ | 1.25 |
| Calcium pantothenate_____ g__ | 0.682 |
| Pyridoxine hydrochloride_____ g__ | 1.25 |
| Water, to make_____ cc__ | 250 |

The pH of the mixture is about 4.02 and contains 25 mg. of nicotinamide, 5 mg. of riboflavin, 5 mg. of thiamin, 5 mg. of pyridoxine and 2.5 mg. of pantothenic acid per cc. The solution is heat-sterilized and is then ready for parenteral use. The solution is stable and shows no evidence of precipitation even on prolonged storage under refrigeration.

We claim:

1. The condensation product formed by heating 1 part of riboflavin with about 2 to 5 parts of glyoxal in aqueous solution.

2. The highly water-soluble condensation product formed by heating riboflavin with 2 to 5 parts of glyoxal in aqueous solution and evaporating off excess water.

3. The process of solubilizing riboflavin, which comprises heating 1 part of riboflavin with about 2 to 5 parts of glyoxal in aqueous solution.

4. The process of preparing a highly water-soluble riboflavin-glyoxal condensation product, which comprises heating 1 part of riboflavin with about 2 to 5 parts of glyoxal in aqueous solution for a period of time sufficient to render the riboflavin soluble, and evaporating the solution to dryness.

5. An aqueous solution containing the condensation product produced by heating about one part of riboflavin with about three parts of glyoxal in the presence of water.

JEAN Q. BELLARD.
GEORGE H. F. SCHNAKENBERG.

REFERENCES CITED

The following references are of record in the file of this patent:

Schoen et al., Arch. Biochem., v. 22 (1949), p. 149-159, 11 pages.